US010088737B2

(12) United States Patent
Hehir

(10) Patent No.: US 10,088,737 B2
(45) Date of Patent: Oct. 2, 2018

(54) HOUSING ASSEMBLY FOR A CAMERA, CAMERA, DRIVER ASSISTANCE SYSTEM AS WELL AS MOTOR VEHICLE

(71) Applicant: Connaught Electronics Ltd., Tuam, County Galway (IE)

(72) Inventor: Colin Patrick Hehir, Galway (IE)

(73) Assignee: Connaught Electronics Ltd., Tuam, County Galway (IE)

(*) Notice: Subject to any disclaimer, the term of this patent is extended or adjusted under 35 U.S.C. 154(b) by 1 day.

(21) Appl. No.: 15/513,653

(22) PCT Filed: Sep. 8, 2015

(86) PCT No.: PCT/EP2015/070422
§ 371 (c)(1),
(2) Date: Mar. 23, 2017

(87) PCT Pub. No.: WO2016/045955
PCT Pub. Date: Mar. 31, 2016

(65) Prior Publication Data
US 2017/0242321 A1 Aug. 24, 2017

(30) Foreign Application Priority Data

Sep. 26, 2014 (DE) ........................ 10 2014 113 992

(51) Int. Cl.
*G03B 17/55* (2006.01)
*G03B 17/02* (2006.01)
*B60R 11/04* (2006.01)

(52) U.S. Cl.
CPC .............. *G03B 17/55* (2013.01); *B60R 11/04* (2013.01); *G03B 17/02* (2013.01)

(58) Field of Classification Search
CPC .......... B60R 11/04; G03B 17/02; G03B 17/55
See application file for complete search history.

(56) References Cited

U.S. PATENT DOCUMENTS

2002/0145677 A1* 10/2002 Ryan ................ G08B 13/196
348/373
2008/0237768 A1 10/2008 Yajima et al.
(Continued)

FOREIGN PATENT DOCUMENTS

DE          41 35 518 A1      4/1992
DE   10 2009 052586 A1      5/2011
WO          2013/103548 A1     7/2013

OTHER PUBLICATIONS

International Search Report issued in corresponding application No. PCT/EP2015/070422 dated Jan. 27, 2016 (2 pages).
(Continued)

*Primary Examiner* — Clayton E Laballe
*Assistant Examiner* — Linda B Smith
(74) *Attorney, Agent, or Firm* — Osha Liang LLP

(57) ABSTRACT

The invention relates to a housing assembly (2) for a camera (1) of a motor vehicle including a camera housing (3) for disposing the camera (1), including a connector housing (4) for protecting an electrical connecting element (10) of the motor vehicle and/or of the camera (1), wherein the camera housing (3) is connected to the connector housing (4) such that the connector housing (4) covers a backside (7) of the camera housing (3) at least in certain areas, and including a venting element (11) for avoiding humidity in the camera housing (3) and/or the connector housing (4), wherein the camera housing (3) has a first vent (12) in the backside (7) and the venting element (11) is disposed between the backside (7) of the camera housing (3) and the connector housing (4) such that the venting element (11) completely covers the first vent (12).

12 Claims, 5 Drawing Sheets

(56) References Cited

U.S. PATENT DOCUMENTS

Figure 1:
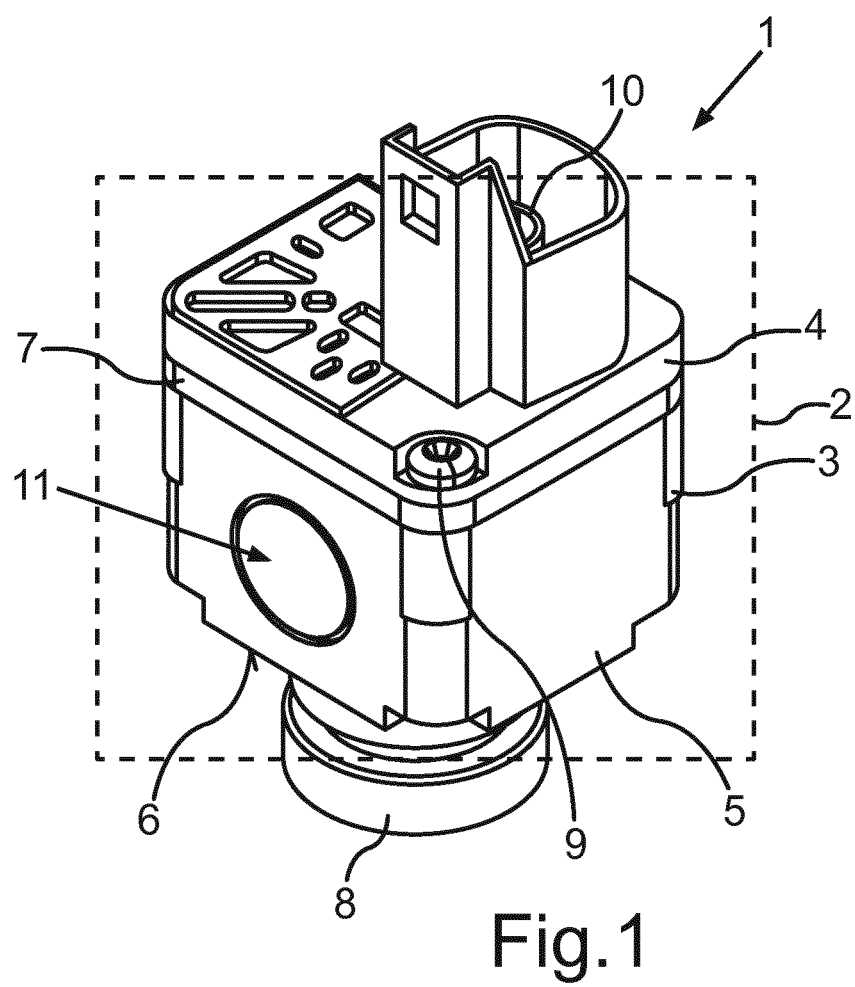

| | | | | |
|---|---|---|---|---|
| 2012/0013741 A1* | 1/2012 | Blake, III | ............... | B60R 11/00 |
| | | | | 348/148 |
| 2013/0142504 A1* | 6/2013 | Warren | .................. | G03B 17/02 |
| | | | | 396/541 |
| 2013/0278820 A1* | 10/2013 | Lin | ....................... | H05K 7/2039 |
| | | | | 348/374 |
| 2016/0212308 A1* | 7/2016 | Ahn | ........................ | G03B 17/02 |
| 2016/0301819 A1* | 10/2016 | Petty | .................. | H04N 1/00981 |
| 2017/0131621 A1* | 5/2017 | Tang | ....................... | G03B 17/02 |

OTHER PUBLICATIONS

Written Opinion of the International Searching Authority issued in corresponding application No. PCT/EP2015/070422 dated Jan. 27, 2016 (6 pages).

* cited by examiner

HOUSING ASSEMBLY FOR A CAMERA, CAMERA, DRIVER ASSISTANCE SYSTEM AS WELL AS MOTOR VEHICLE

The invention relates to a housing assembly for a camera of a motor vehicle including a camera housing for disposing the camera, including a connector housing for protecting an electrical connecting element of the motor vehicle and/or of the camera, wherein the camera housing is connected to the connector housing such that the connector housing covers a backside of the camera housing at least in certain areas, and including a venting element for avoiding humidity in the camera housing and/or the connector housing. In addition, the invention relates to a camera with a housing assembly, to a driver assistance system with a camera as well as to a motor vehicle with a driver assistance system.

Cameras can be attached to a motor vehicle to capture an environmental region of the motor vehicle. Therein, the cameras are usually exposed to weather conditions as well as to severe temperature variations, which for example arise in that the housings of the cameras heated in the operation come into contact with cold ambient air of the motor vehicle. Such temperature variations can result in a severe overpressure or negative pressure in the housings of the cameras. It can also be that condensed water forms in the housings of the cameras due to the ambient conditions, which may result in damage and/or destruction of the electronic components or the electronic parts of the camera in the housing. These damaged or defect electronic components usually have to be exchanged, which results in undesired repair costs.

In order to avoid this, venting elements are known from the prior art, which are integrated in the housing of the camera. These venting elements ensure pressure equalization and avoid development of humidity in the housing and transport humidity out of the housing, respectively. In addition, the venting elements are to avoid those liquids and dirt particles enter the housing. Such venting elements are for example produced by the company Gore® and are known as so-called "automotive vents".

Since these venting elements are usually integrated in the camera housing such that the venting elements are also exposed to the ambient conditions, it can occur that the venting elements are damaged or detached from the housing for example by water directly impacting on the venting elements. Thereby, humidity and dirt particles in turn can enter the housing and destroy the electronic components disposed therein.

US 2013/0142504 A1 for example describes a further possibility of preventing dirt particles from entering a housing. There, a housing assembly for a camera is described, which has a camera housing for disposing a lens and a connector housing. An annular sealing element, in particular an O-ring, is disposed between the camera housing and the connector housing.

It is the object of the present invention to provide a housing assembly, in which the electronic components disposed therein can be more reliably protected from environmental influences.

According to the invention, this object is solved by a housing assembly, a camera, a driver assistance system as well as a motor vehicle having the features according to the respective independent claims. Advantageous implementations of the invention are the subject matter of the dependent claims, of the description and of the figures.

A housing assembly according to the invention for a camera of a motor vehicle includes a camera housing for disposing the camera, a connector housing for protecting an electrical connecting element of the motor vehicle and/or of the camera, wherein the camera housing is connected to the connector housing such that the connector housing covers a backside of the camera housing at least in certain areas, and a venting element for avoiding humidity in the camera housing and/or in the connector housing. Moreover, the camera housing has a first vent in the backside, wherein the venting element is disposed between the backside of the camera housing and the connector housing such that the venting element completely covers the first vent.

The camera housing, in which the camera for the motor vehicle is provided, can for example be cuboid-shaped or cylindrically configured, wherein the cuboid-shaped or cylindrical camera housing can have a housing shroud, a housing bottom and a backside formed as a housing lid. A lens of the camera can for example be disposed in a through-opening of the housing bottom at least in certain areas. Therein, the lens can be mechanically screwed and/or adhered to the housing bottom.

Electronic components, for example an image sensor of the camera, storage elements, integrated circuits or processors, can be disposed on one or more circuit boards within the camera housing. The housing lid can close the camera housing such that dirt particles and/or humidity cannot enter the housing and thereby damage the electronic components located therein.

In order to supply the electronic components of the camera within the camera housing with energy and/or for example to transport the image data of the image sensor out of the camera housing, the electrical connecting element is provided. The electrical connecting element can for example be integrated in the backside of the camera housing. The electrical connecting element can be configured as a plug connection element, for example as a plug or as a socket. By means of the electrical connecting element, the camera can be connected to a voltage supply of the motor vehicle. In addition, the camera can be connected to a bus system, for example a CAN or FlexRay bus system, of the motor vehicle by means of the electrical connecting element.

The connector housing serves for protecting the electrical connecting element. Therein, the connector housing can for example include a shroud for shrouding the electrical connecting element. The connector housing can for example have a base surface, which corresponds to the base surface of the backside of the camera housing. The connector housing can also be mechanically connected, in particular screwed, to the backside of the camera housing. The connector housing can also be connected to the camera housing in locking manner. Therein, the connector housing covers the backside of the camera housing at least in certain areas.

Now, for example, in order to prevent humidity from arising in the camera housing and/or to transport humidity out of the camera housing and/or to provide pressure equalization, the camera housing has a first vent. The first vent can for example be configured as a hole in the backside of the camera housing. Thus, humidity can for example escape from the camera housing. In addition, gas, for example oxygen or air, can escape from the camera housing or enter the camera housing. By this air exchange between the interior and the exterior of the camera housing, both pressure exchange and air circulation can be allowed, which in particular prevents formation of condensed water in the camera housing.

Now, in order to prevent dirt particles and/or humidity from entering the camera housing, the venting element is disposed on the backside of the camera housing such that the venting element completely covers the vent. The humidity, for example in the form of water vapor and/or gas, can in particular only escape from the camera housing via the venting element.

In that the connector housing is disposed on the backside of the camera such that the connector housing covers the backside of the camera housing, the venting element is covered by the connector housing at the same time. Thereby, the advantage arises that the venting element is protected from for example direct water influence and/or direct dirt influence by the connector housing. Despite of the coverage of the venting element by the connector housing, the venting element is able to fully satisfy its functionality, namely preventing humidity from forming in the camera housing and dirt particles and/or humidity from entering the housing. The venting element is protected by the connector housing such that the venting element is not directly exposed to detrimental environmental influences, but is not inhibited in its functionality. Thus, the electric components within the camera housing are particularly reliably protected. In addition, for manufacturing the housing assembly, additional components and/or an altered configuration of the venting element are not required, whereby alterations in the manufacturing process of the housing assembly do not have to be provided.

Preferably, the connector housing has a second vent. The second vent in particular serves to that the gas and/or the liquid, which were transported out of the camera housing for example by means of the venting element, are able to escape out of the housing assembly via the connector housing and/or the gas can enter the camera housing via the venting element. Therein, this second vent can be provided spatially separated from the venting element disposed below the connector housing, in particular not directly above the venting element. Thus, water can for example be prevented from directly impacting on the venting element through the second vent. Thereby, the venting element is particularly well protected from external influences.

Preferably, the connector housing has a protection device for protecting the venting element. This protection device can for example be integrated in the connector housing in the form of a protecting shield. In addition, the protection device can be formed such that it allows air exchange. This protection device preferably completely covers the venting element such that the venting element is for example not directly exposed to splash water.

In an advantageous development, the backside of the camera housing has a retaining device for retaining the venting element. Thereby, the venting element can be particularly securely placed on the backside of the camera housing. Thus, the venting element can be prevented from detaching from the backside of the camera housing. Thereby, the housing assembly particularly reliably protects the electrical components provided in the camera housing.

Advantageously, the retaining device is configured as a recess in the backside of the camera housing. Therein, the recess can have the same size as the venting element in terms of area. Thus, the venting element can be disposed on the backside of the camera housing or be integrated in the backside of the camera housing in particularly space saving manner.

It proves advantageous if the venting element is configured as a membrane. A membrane is usually a thin layer of a certain material, which is suitable to influence the transport of certain substances, for example humidity and/or dirt particles, through this layer. Thus, membranes can for example be partially permeable (semi-permeable or selectively permeable). This means that the membrane can be permeable only to certain substances, for example to water vapor and oxygen. It can also be that the membrane is permeable to certain substances only in one direction (unidirectionally permeable). Since membranes are particularly thin, they have a low weight. In addition, membrane characteristics can be particularly well adjusted, whereby membranes can be adequately manufactured. Thus, membranes can for example be produced, which can be exposed to particularly high temperatures. Thus, a venting element in the form of a membrane can be particularly individually configured and optimally adapted to the site of use of the housing assembly.

Particularly preferably, the venting element includes a material permeable to gas and/or permeable to water vapor. Therein, the venting element is preferably configured such that water vapor can escape from the camera housing, but not enter the camera housing. Gas, for example air, can both escape from the camera housing and enter the camera housing for pressure equalization. By such a venting element, which is for example configured as a breathable membrane, a pressure difference between the camera housing interior and the environment can be equalized in particularly simple manner. In addition, condensed water can be particularly well transported out of the camera housing or even formation of condensed water in the camera housing can be avoided. Thereby, the condensed water can be prevented from damaging the electronic components or the electronic parts within the camera housing.

In an advantageous development, the venting element has a self-adhesive material and/or is formed of a self-adhesive material. Thus, the venting element, for example in the form of a self-adhesive membrane, can be applied to the backside of the camera housing over the venting element in particularly simple manner. To this, additional fixing elements, for example screws, are not required. This advantageously saves both weight and material. The housing assembly is therefore particularly inexpensively configured.

It can be provided that the venting element is circularly formed. The venting element can be cylindrically formed. The venting element can also be plate-shaped formed. A venting element, which is for example configured as a circular, in particular self-adhesive, membrane, adheres particularly well to the backside of the camera housing.

In addition, the invention relates to a camera with a housing assembly according to the invention. Since the camera with the housing assembly according to the invention is configured particularly robustly against environmental influences, is can advantageously also be attached outside of the vehicle, where it can be exposed to weather conditions and severe temperature variations.

In addition, a driver assistance system for a motor vehicle with at least one camera according to the invention is associated with the invention. The driver assistance system is adapted to assist a driver of the motor vehicle in driving the motor vehicle.

A motor vehicle according to the invention includes a driver assistance system according to the invention. The motor vehicle can in particular be formed as a passenger car.

The preferred embodiments presented with respect to the housing assembly according to the invention and the advantages thereof correspondingly apply to the camera according to the invention, to the driver assistance system according to the invention as well as to the motor vehicle according to the invention.

Further features of the invention are apparent from the claims, the figures and the description of figures. All of the features and feature combinations mentioned above in the description as well as the features and feature combinations mentioned below in the description of figures and/or shown in the figures alone are usable not only in the respectively specified combination, but also in other combinations or else alone.

Now, the invention is explained in more detail based on a preferred embodiment as well as with reference to the attached drawings.

Figure 2:
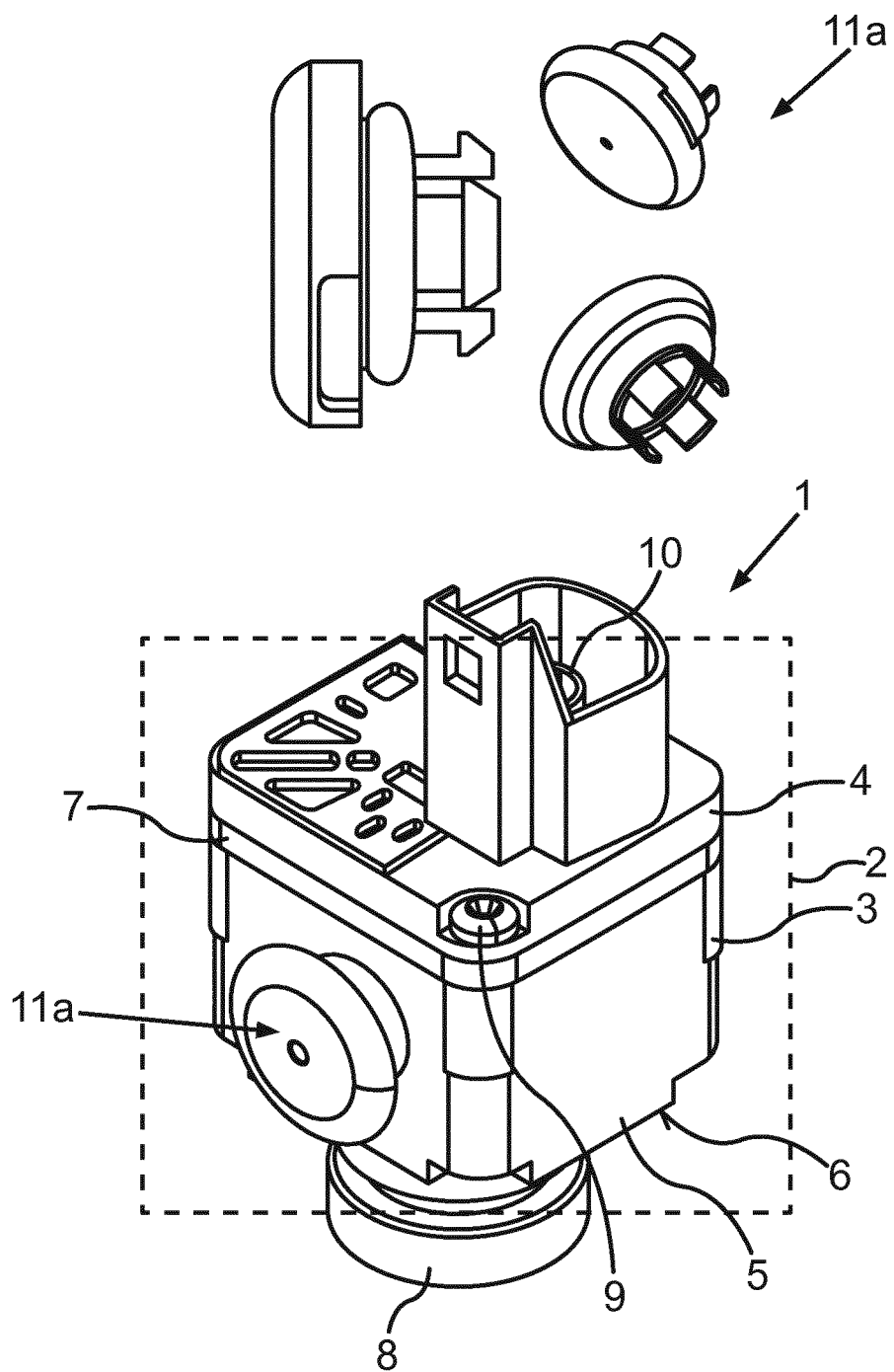
Figure 3:
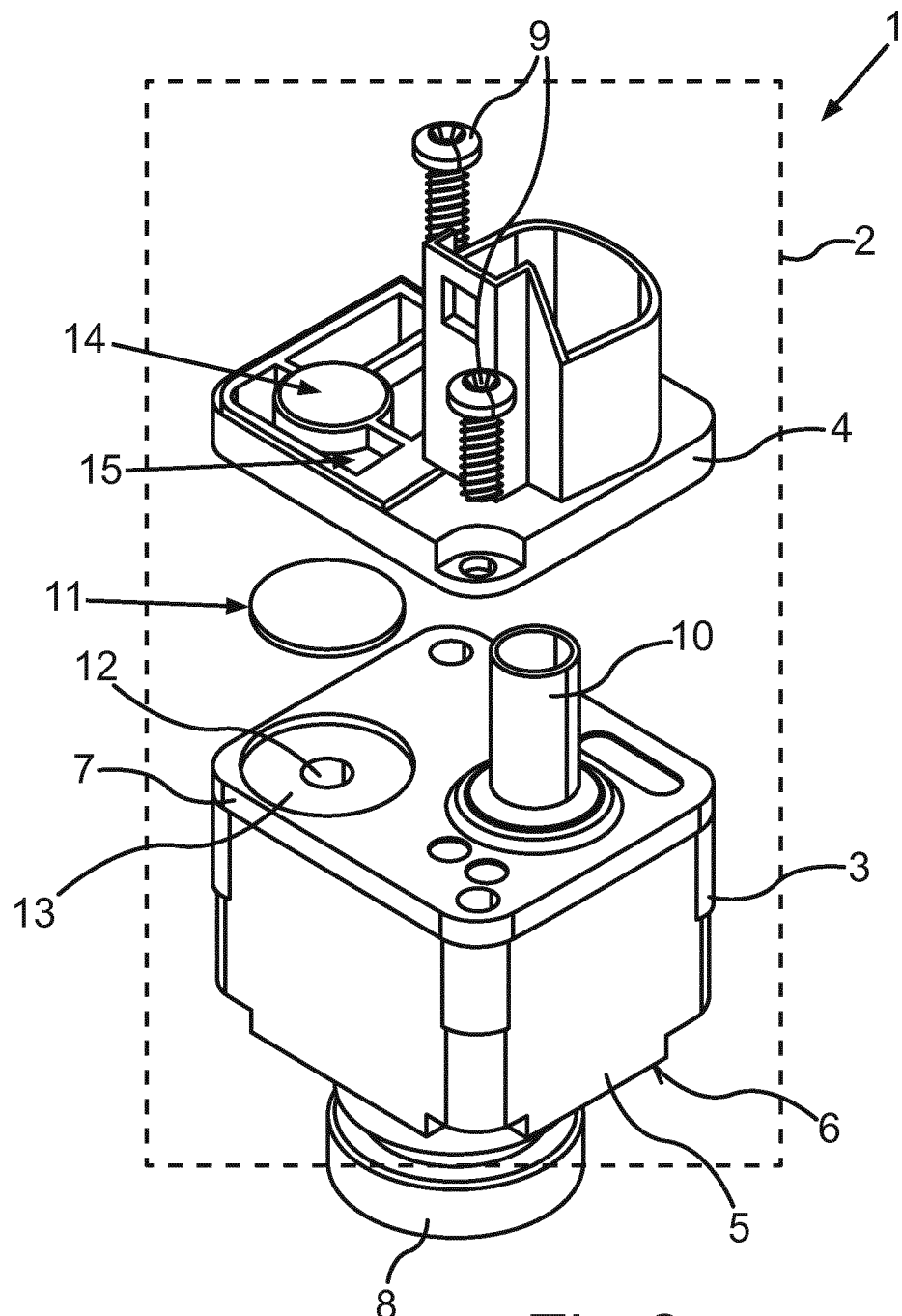
Figure 4:
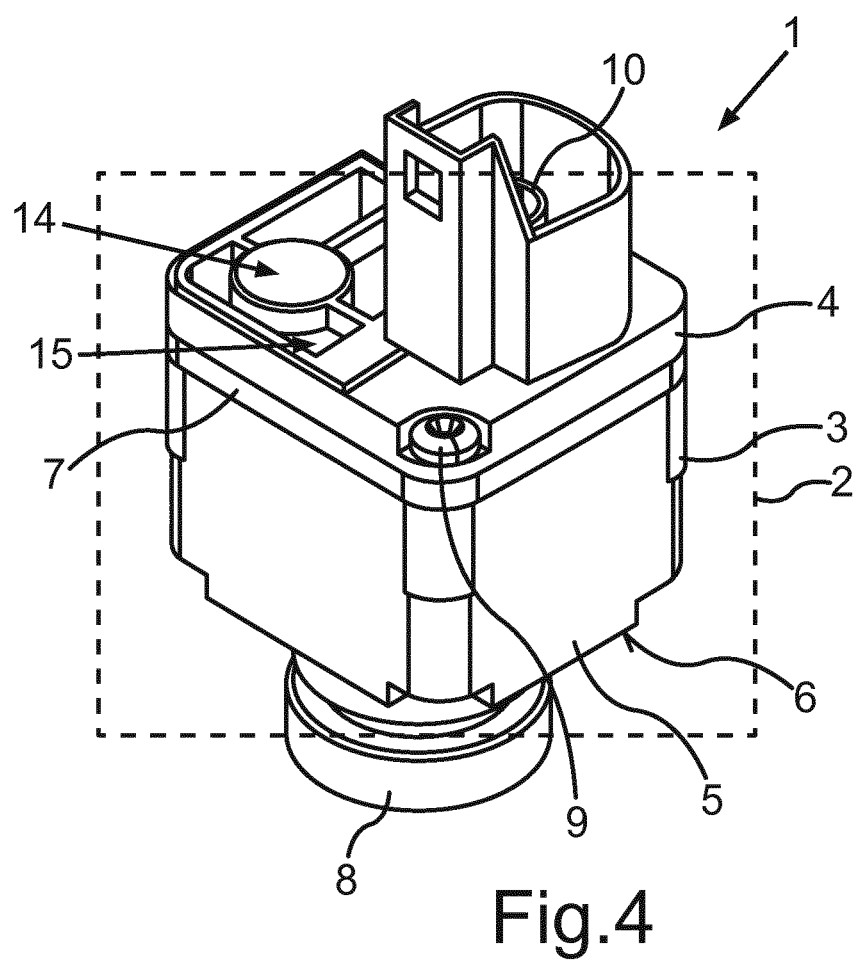
Figure 5:
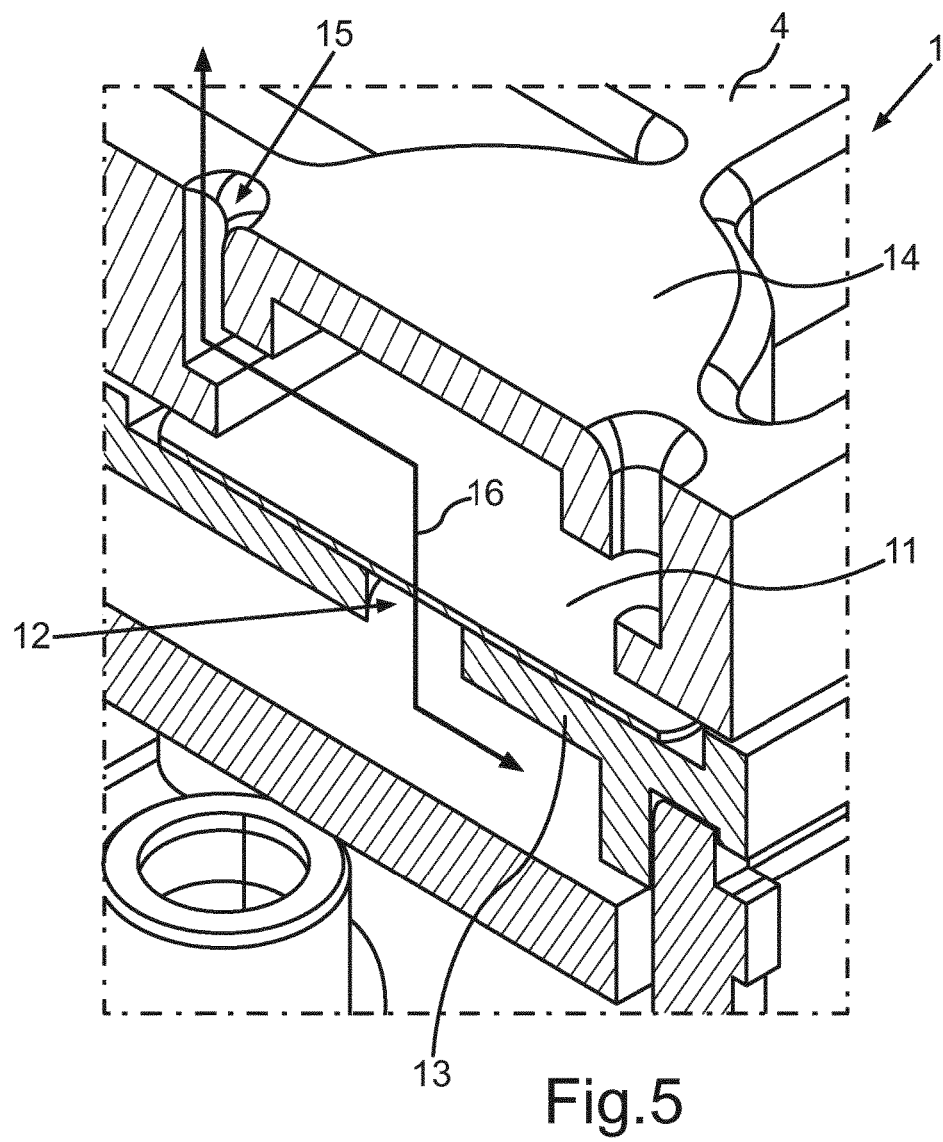

There show:

FIG. 1 a schematic illustration of a camera of a motor vehicle with a housing assembly according to the prior art;

FIG. 2 a schematic illustration of a camera of a motor vehicle with a further housing assembly according to the prior art;

FIG. 3 a schematic illustration of a camera according to the invention with an embodiment of a housing assembly according to the invention in exploded presentation;

FIG. 4 a schematic illustration of a camera according to the invention with an embodiment of a housing assembly according to the invention; and FIG. 5 a sectional view of a housing assembly according to the invention.

In the Figures, identical or functionally identical elements are provided with the same reference characters.

FIG. 1 shows a schematic illustration of a camera 1 with a housing assembly 2 according to the prior art. For example, the camera 1 can be provided in or on a motor vehicle and be adapted to capture an environment of the motor vehicle in images.

The housing assembly 2 includes a camera housing 3 and a connector housing 4. Here, the camera housing 3 is formed cuboid-shaped and has a housing shroud 5, a housing bottom 6 and a backside 7 formed as a housing lid, by means of which the camera housing 3 is closable. Here, a lens 8 of the camera 1 is integrated in the housing bottom 6. Electronic components, for example an image sensor, data processing devices, data storage devices as well as integrated circuits, can be located within the camera housing 3.

Here, the connector housing 4 has a base surface in the size of the surface of the backside 7 of the camera housing 3. The connector housing 4 can be mechanically connected to the backside 7 of the camera housing, for example via screws 9. Here, the connector housing 4 completely covers the backside 7 of the camera housing 3. The connector housing 4 serves for protecting an electrical connecting element 10, for example a plug. The electrical connecting element 10 can for example be integrated in the backside 7 of the camera housing 3. By means of the electrical connecting element 10, the camera 1 can for example be connected to a data and communication system and/or an energy supply device of the motor vehicle. Thus, the captured data of the camera 1 can for example be provided to a driver assistance system of the motor vehicle.

Here, a venting element 11 is integrated in the housing shroud 5 of the camera housing 3. The venting element 11 is adapted to prevent humidity formation in the camera housing 3 and/or to transport humidity out of the camera housing 3 and/or to provide pressure equalization between an interior of the camera housing 3 and an exterior of the camera housing 3. In addition, the venting element 11 serves for preventing for example dirt particles and/or humidity from entering the camera housing 3 and thus the electronic components within the camera housing 3 from being damaged and/or destroyed.

Here, the venting element 11 is integrated in the housing shroud 5 of the camera housing 3 such that the venting element 11 is exposed to environmental influences, for example rain water. Therein, it can occur that the venting element 11 is damaged and/or destroyed by these environmental influences themselves and thus is no longer able to fulfill its intended function. If the venting element 11 is for example configured as a self-adhesive membrane, it can occur that this membrane detaches, tears or breaks due to the environmental condition and thus is no longer able to prevent dirt particles and/or humidity from entering the camera housing 3.

FIG. 2 shows a further embodiment of a camera 1 according to the prior art. Here, the camera 1 has a venting element 11a in the lateral surface 5 of the camera housing 3. The venting element 11a can for example be a so-called "PolyVent" of the company Gore® and have an own housing. The venting element 11a is configured particularly robustly against external environmental influences, but it needs a high space requirement and has a comparatively high weight. In addition, thus configured venting elements 11a are very expensive.

FIG. 3 shows a schematic illustration of a camera 1 according to the invention with a housing assembly 2 according to the invention in exploded presentation. Here, the venting element 11 is disposed between the backside 7 of the camera housing 3 and the connector housing 4. The backside 7 of the camera housing 3 has a first vent 12. Here, the first vent 12 is configured as a through-opening or bore in the backside 7 of the camera housing 3. Here, the venting element 11 is configured as a circular, in particular self-adhesive, and breathable membrane. The membrane is preferably configured of a material permeable to water vapor and/or gas. In order to dispose the venting element 11 in particularly space saving and secure manner, the backside 7 of the camera housing 3 has a retaining device 13, which is here configured as a recess in the backside 7 of the camera housing 3. By the vent 12 and the venting element 11 disposed over it, gas, in particular air, can be exchanged between the interior and the exterior of the camera housing 3 for pressure equalization and/or for preventing condensed water formation in the camera housing 3. At the same time, the venting element 11 prevents humidity from entering the camera housing 3 from the outside. For transporting humidity out of the camera housing 3, the venting element 11 is in particular permeable to water vapor only in one direction, namely from the interior of the camera housing 3 to the exterior of the camera housing 3.

In that the venting element 11 is covered by the connector housing 4, which is attached to the backside 7 of the camera housing 3 with screws 9, direct water can for example be prevented from impacting on the venting element 11. By direct water, the venting element 11 can for example be damaged. In addition, the connector housing 11 can have a protection device 14 covering the venting element 11. Here, the protection device 14 is configured as a circular shield integrated in the connector housing 4 and here completely covers the venting element 11. In addition, the connector housing 4 can have a second vent 15. The second vent 15 is in particular not disposed directly over the venting element 11 such that water for example cannot impact on the venting element 11 via the second vent 15.

FIG. 4 shows a schematic illustration of an embodiment of the camera 1 according to the invention with a housing assembly 2 according to the invention. Here, the venting element 11 is between the backside 7 of the camera housing 3 and the connector housing 4 and thus is not visible from the outside. The connector housing 4 constitutes a protection for the venting element 11. Thus, the venting element 11 is not exposed to direct environmental influences.

FIG. 5 shows the camera 1 according to the invention in a sectional view, which shows a possible path 16 of a gas, for example of oxygen or air, out of the camera housing 3 and/or into the camera housing 3. Thus, air can for example escape from the interior of the camera housing 3 through the first vent 12 in the backside 7 of the camera housing 3 via the venting element 11 into a clearance between the camera housing 3 and the connector housing 4. By the second vent 15 in the connector housing 4, the air can escape from the clearance and thereby from the entire housing assembly 2. In reverse, air can enter the clearance via the second vent 15 of the connector housing 4 and enter the camera housing 3 through the oxygen-permeable venting element 11 and the first vent 12. By this air exchange between the interior and the exterior of the camera housing 3, both pressure exchange and air circulation can be allowed, which prevents formation of condensed water in the camera housing 3. In that the second vent 15 is not directly disposed over the venting element 11, the gas cannot escape from the clearance and thereby out of the housing assembly on direct way, but via a detour.

The invention claimed is:

1. A housing assembly for a camera of a motor vehicle comprising:
   a camera housing for disposing the camera;
   a connector housing for protecting an electrical connecting element of the motor vehicle and/or of the camera,
   wherein the camera housing is connected to the connector housing such that the connector housing covers a backside of the camera housing at least one or more portions; and
   a venting element for avoiding humidity in the camera housing and/or the connector housing,
   wherein the camera housing has a first vent in the backside, and the venting element is disposed between the backside of the camera housing and the connector housing such that the venting element completely covers the first vent.

2. The housing assembly according to claim 1, wherein the connector housing has a second vent.

3. The housing assembly according to claim 1, wherein the connector housing has a protection device for protecting the venting element.

4. The housing assembly according to claim 1, wherein the backside of the camera housing has a retaining device for retaining the venting element.

5. The housing assembly according to claim 4, wherein the retaining device of the backside of the camera housing is configured as a recess in the backside.

6. The housing assembly according to claim 1, wherein the venting element is configured as a membrane.

7. The housing assembly according to claim 1, wherein the venting element includes a material permeable to gas and/or permeable to water vapor.

8. The housing assembly according to claim 1, wherein the venting element has a self-adhesive material and/or is formed of a self-adhesive material.

9. The housing assembly according to claim 1, wherein the venting element is circularly formed.

10. A camera with a housing assembly according to claim 1.

11. A driver assistance system for a motor vehicle with at least one camera according to claim 10.

12. A motor vehicle with a driver assistance system according to claim 11.

* * * * *